(12) United States Patent
Lucchi et al.

(10) Patent No.: US 9,903,398 B2
(45) Date of Patent: Feb. 27, 2018

(54) DEVICE FOR GENERATING A MAGNETIC FIELD ASSOCIABLE WITH A MOVABLE ROD OF A PNEUMATIC ACTUATOR AND METHOD FOR MAKING THE DEVICE

(71) Applicant: FAIST COMPONENTI S.P.A., Montone (Perugia) (IT)

(72) Inventors: Elena Lucchi, Umbertide (IT); Stefano Benicchi, Perugia (IT)

(73) Assignee: FAIST COMPONENTI S.P.A., Montone (IT)

( * ) Notice: Subject to any disclaimer, the term of this patent is extended or adjusted under 35 U.S.C. 154(b) by 357 days.

(21) Appl. No.: 14/698,076

(22) Filed: Apr. 28, 2015

(65) Prior Publication Data

US 2015/0316082 A1    Nov. 5, 2015

(30) Foreign Application Priority Data

Apr. 30, 2014 (IT) .............................. VR2014A0110

(51) Int. Cl.
| | | |
|---|---|---|
| *F15B 15/28* | (2006.01) | |
| *G01B 7/00* | (2006.01) | |
| *G01D 5/14* | (2006.01) | |
| *G01D 11/24* | (2006.01) | |
| *B29C 31/04* | (2006.01) | |

(Continued)

(52) U.S. Cl.
CPC .......... *F15B 15/2861* (2013.01); *B29C 31/04* (2013.01); *F15B 15/10* (2013.01); *G01B 7/003* (2013.01); *G01D 5/14* (2013.01); *G01D 5/145* (2013.01); *G01D 11/245* (2013.01); *B29L 2031/748* (2013.01); *F02B 37/186* (2013.01)

(58) Field of Classification Search
CPC .. B29C 31/04; B29L 2031/748; F02B 37/186; F15B 15/10; F15B 15/28; F15B 15/2861; G01B 7/003; G01B 7/14; G01D 5/14; G01D 5/145; G01D 11/245
See application file for complete search history.

(56) References Cited

U.S. PATENT DOCUMENTS 6,157,186 A     12/2000  Aoki et al.
6,352,137 B1 *  3/2002   Stegall ................... F16D 65/28
                                                        188/1.11 E (Continued)

FOREIGN PATENT DOCUMENTS

IT           1393598        3/2009

*Primary Examiner* — Logan Kraft
(74) *Attorney, Agent, or Firm* — Pearne & Gordon LLP

(57) ABSTRACT

A device (1) for generating a magnetic field, associable with a movable rod (3) of a pneumatic actuator (2), comprising a containment element (4) comprising an elongate portion (5) and a flange (6) at a base (7) of the elongate portion (5), a housing (8) inside the elongate portion (5), a mouth (9) of the housing (8) and a magnet (10) positioned in the housing (8), the flange (6) comprising an annular surface (11) extending mainly flat with an inner edge (12) surrounding the mouth (9) of the housing (8), characterized in that it also comprises a closing element (13) inserted in the housing (8) through the mouth (9) of the housing (8) and extending outside the housing (8) beyond a main plane of extension of the annular surface (11), and in that the closing element (13) is substantially made of an elastically compressible polymeric material solidified directly in the housing (8).

8 Claims, 3 Drawing Sheets

(51) Int. Cl.
*F15B 15/10* (2006.01)
*B29L 31/00* (2006.01)
*F02B 37/18* (2006.01)

(56) References Cited

U.S. PATENT DOCUMENTS

| | | | |
|---|---|---|---|
| 6,472,624 B1 | 10/2002 | Harris et al. | |
| 6,639,398 B2 | 10/2003 | Genot et al. | |
| 7,348,388 B2 * | 3/2008 | Ittel | C08F 10/00 |
| | | | 526/242 |
| 7,423,421 B2 | 9/2008 | Reichert et al. | |
| 8,400,142 B2 * | 3/2013 | Storrie | G01D 5/145 |
| | | | 324/207.11 |
| 8,997,629 B2 | 4/2015 | Natali | |
| 9,453,854 B2 * | 9/2016 | Kraige | G01P 15/097 |
| 2011/0030369 A1 | 2/2011 | Natali | |
| 2011/0147625 A1 | 6/2011 | Speer | |

* cited by examiner

DEVICE FOR GENERATING A MAGNETIC FIELD ASSOCIABLE WITH A MOVABLE ROD OF A PNEUMATIC ACTUATOR AND METHOD FOR MAKING THE DEVICE

CROSS-REFERENCE TO RELATED APPLICATIONS

The present application claims the benefit of Italian Patent Application No. VR2014A000110 filed on Apr. 30, 2014, which is incorporated herein by reference in its entirety.

DESCRIPTION

This invention relates to a device for generating a magnetic field associable with a movable rod of a pneumatic actuator and a method for making the device according to the invention. This invention is intended, in particular, for pneumatic actuators used in internal combustion engines of vehicles and even more particularly for controlling (the turbines of) turbo-compressors.

Therefore, hereinafter reference will be made to that family of actuators, although this invention may in any case also apply to actuators intended for other uses.

In general, pneumatic actuators are devices which have a containment structure the inside of which forms a chamber divided into two further chambers by a flexible diaphragm mounted in a fluid-tight fashion. Attached to the diaphragm there is a first end of a movable rod which extends through the containment structure and which has a second, outer end which in use is connected to the device to be controlled (such as the turbo-compressor).

At least one of the two chambers formed by the diaphragm in the actuator, as well as being a chamber whose volume is variable depending on the shape adopted by the diaphragm, is made in such a way that it is fluid-tight and is connected to a duct through which it is possible to vary its internal pressure (by generating an overpressure or vacuum using an external source).

Fixed to the diaphragm and to the movable rod there is a coupling cup and interposed between the coupling cup and the containment structure there is a spring designed to oppose the variations in the volume of the above-mentioned variable-volume chamber (in the most widespread solutions in which a vacuum is used, the spring tends to keep the chamber at its maximum volume).

The combined action of the pressure variation and the spring can therefore cause a controlled movement of both the diaphragm and, consequently, the end of the movable rod fixed to it.

To be able to control the position of the movable rod in use, the pneumatic actuators are also provided with suitable detection means which may have different forms, depending on requirements.

In particular there are prior art detection means based on detection of a magnetic field. Said detection means are usually constituted of a device fixed to the movable rod and containing a magnet which generates a magnetic field and of a device for detecting the magnetic field, comprising for example a Hall effect sensor which is fixed to the actuator containment structure. Movement of the magnet relative to the detection sensor varies the intensity of the magnetic field present at the sensor and so allows the position of the device fixed to the movable rod to be determined based on what the sensor detected.

Examples of such a type of detection means are described in U.S. Pat. No. 6,639,398 and in Italian patent No. 1393598.

Detection means based on detection of the magnetic field include a sub-family of detection means in which the device fixed to the movable rod and containing the magnet is positioned inside the containment structure in a position adjacent to the detection sensor. In this way, the detection sensor detects different magnetic field values due to the variation in the position of the magnet, which in turn is due to the variation in the position of the movable rod. The device for generating the magnetic field comprises a rigid containment element comprising an elongate portion, in which a housing containing the magnet is made, and a flange at the base of the containment structure which can be fixed to the coupling cup of the pneumatic actuator using hooking means, in such a way as to fix the device to the movable rod and to the diaphragm.

In the prior art technology, the flange comprises an annular surface mainly extending flat and surrounding a mouth of the housing. On that flat surface there is an annular channel in which an O-ring made of elastically deformable plastic material is inserted. Finally, the housing, at least near to the mouth, is filled with a solidified polymeric material which seals it in a fluid-tight fashion.

Since the flat surface is the contact surface of the magnetic field generating device with the coupling cup, when said device is fixed to the coupling cup, the function of the O-ring is to allow stable positioning of the device relative to the coupling cup after compression of the O-ring between the flange and the coupling cup. The O-ring also allows compensation of the coupling tolerances between the flange and the coupling cup during locking using the hooking means. However, the prior art technology has the disadvantage of a relative high production cost, both in terms of the costs of the various components, and in terms of assembly costs.

Moreover, in the prior art technology, although the magnet is retained by the polymeric material in the housing, there is still the risk that, following the stresses that it may be subjected to during use, it will rotate relative to the containment element.

Consequently, since the magnet may not have absolutely uniform polarization about its own central axis, the sensor for detecting the magnetic field may give an incorrect reading of the position of the movable rod.

Another example of a pneumatic actuator comprising detection means based on detection of the magnetic field is described in U.S. Pat. No. 7,423,421, which illustrates a magnetic field generating device that is fixed to the movable rod, comprising a containment element constituted of two parts, an annular first part rigidly fixed to the cup, and a second part inserted so that it passes through the first part and capable of being angled relative to the first part in order to compensate for any misalignments. The second part comprises a housing in which a magnet is positioned. An elastomeric bearing is also positioned between the magnet and the first end of the movable rod, and is designed to allow angling of the movable rod relative to the main axis of extension of the magnet.

In this context, the technical purpose which forms the basis of this invention is to provide a device for generating a magnetic field associable with a movable rod of a pneumatic actuator and a method for making the device according to the invention which overcomes the above-mentioned disadvantages.

In particular, the technical purpose of this invention is to provide a device for generating a magnetic field associable with a movable rod of a pneumatic actuator and a method for making the device according to the invention which has a lower cost than the prior art ones.

Furthermore, it is the technical purpose of this invention to provide a magnetic field generating device associable with a movable rod of a pneumatic actuator in which there is no risk that the magnet may rotate relative to the containment element so that, once the device has been inserted in a magnetic actuator, it allows a reliable reading of the position of the movable rod by the detection device.

The technical purpose specified and the aims indicated are substantially achieved by a device for generating a magnetic field associable with a movable rod of a pneumatic actuator and a method for making the device according to the invention as described in the appended claims.

Further features and the advantages of this invention are more apparent in the detailed description, with reference to the accompanying drawings which illustrate several preferred, non-limiting embodiments of a device for generating a magnetic field associable with a movable rod of a pneumatic actuator and a method for making the device according to the invention, in which.

Figure 1:
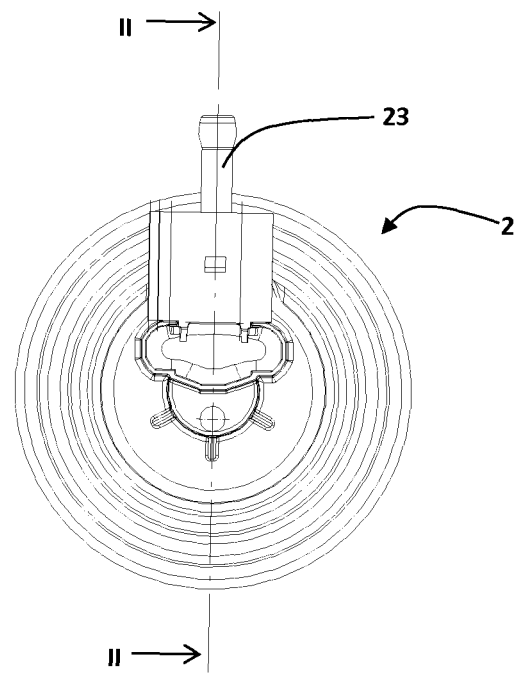
FIG. 1 is a top view of a pneumatic actuator comprising a device for generating a magnetic field made in accordance with this invention.
Figure 3:
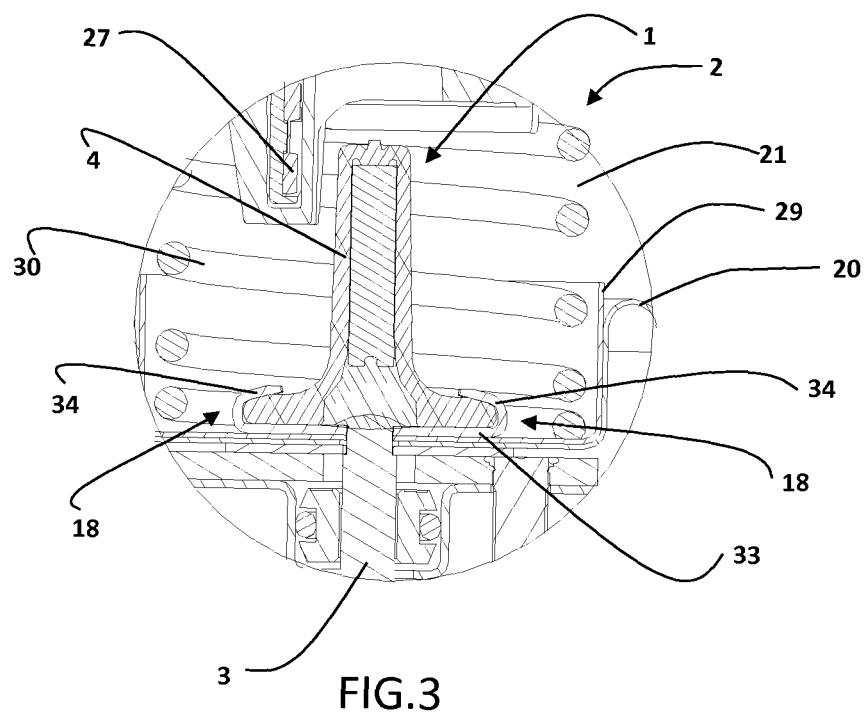
FIG. 3 shows an enlarged detail from FIG. 2.

With reference to the above-mentioned figures the numeral 1 denotes in its entirety a device for generating a magnetic field associable with a movable rod of a pneumatic actuator according to this invention and the numeral 2 denotes a pneumatic actuator on which said device 1 is mounted.

The device 1 for generating a magnetic field according to this invention comprises a containment element 4 comprising an elongate portion 5 and a flange 6 at a base 7 of the elongate portion 5. The device 1 also comprises a housing 8 inside the elongate portion 5, a mouth 9 of the housing 8 and a magnet 10 positioned in the housing 8. The flange 6 comprises an annular surface 11 extending mainly flat in a main plane of extension. An inner edge 12 of the annular surface 11 surrounds the mouth 9 of the housing 8.

In the embodiments illustrated in the accompanying figures, the housing 8 extends mainly along an axis substantially perpendicular to the main plane of extension of the annular surface 11, but other mutual arrangements are possible depending on requirements. Moreover, in the embodiments illustrated in the accompanying figures, the magnet 10 has a cylindrical shape.

The device 1 according to this invention also comprises a closing element 13 inserted in the housing 8 through the mouth 9 of the housing 8 and extending outside the housing 8 beyond the main plane of extension of the annular surface 11.

Advantageously, the closing element 13 seals the housing 8 in such a way as to isolate in a fluid-tight fashion the magnet 10 present in the housing 8.

According to this invention, the closing element 13 is substantially made of an elastically compressible polymeric material. Advantageously this is a resin, preferably a polyurethane resin.

In the preferred embodiments, the closing element 13 is substantially made of a polymeric material solidified in the housing 8 in such a way that it adheres to the containment element 4. Therefore, as described in detail below, the closing element 13 is formed as a result of insertion of the polymeric material in liquid or gel form in the housing 8 and its subsequent solidification.

In the embodiments illustrated in the accompanying figures, the magnet 10 comprises a groove 14 on a face 15 which faces towards the mouth 9 of the housing 8, in which the solidified polymeric material is inserted. Said groove is designed to substantially prevent the magnet 10 from rotating relative to the housing 8. The groove 14 advantageously has diametrical extension relative to the axis of the housing 8, but in other embodiments it may have any other shape which does not have cylindrical symmetry relative to the axis.

Figure 7:
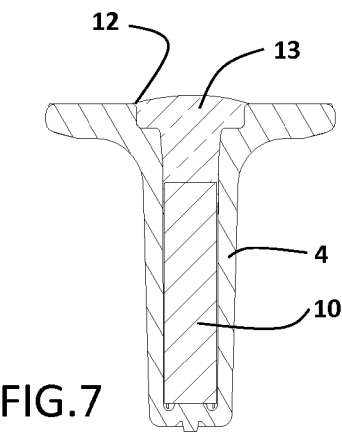
FIG. 7 is a cross-sectional view of a first embodiment of the device of FIG. 4 according to section line V-V of FIG. 4.

In a first embodiment illustrated in FIG. 7, the closing element 13, once solidified, extends substantially beyond the plane of extension of the annular surface 11 but does not extend on the annular surface 11.

Figure 8:
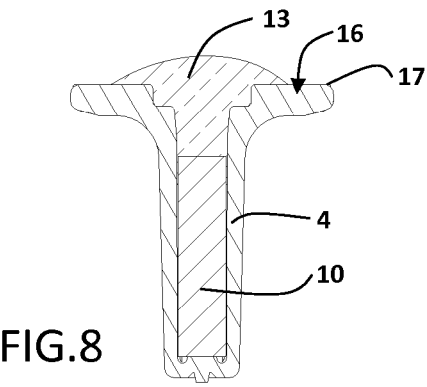
FIG. 8 is a cross-sectional view of a second embodiment of the device of FIG. 4 according to section line V-V of FIG. 4.

In contrast, in a second embodiment illustrated in FIG. 8, the closing element 13, as well as extending substantially beyond the plane of extension of the annular surface 11, also partly extends on the annular surface 11.

Moreover, advantageously, both in the first and in the second embodiment, the surface portion 16 of the annular surface 11 located between an outer edge 17 of the annular surface 11 and the closing element 13 is substantially flat. As described in more detail below in the description of the method for making the device 1, the insertion of a polymeric material in liquid or gel form in the housing 8, and its subsequent solidification, makes it possible to obtain a closing element 13 which at the same time seals the housing 8 containing the magnet 10, allows stable positioning of the device 1 when it is locked using hooking means 18 inside the pneumatic actuator 2 (as illustrated below) without having to provide an O-ring as in the prior art, and prevents the magnet 10 substantially from rotating relative to the containment element 4.

In the embodiments illustrated in the accompanying figures, the pneumatic actuator 2, equipped with the device 1 for generating a magnetic field according to this invention, comprises first a containment structure 19 and a diaphragm 20 inside the containment structure 19. The diaphragm divides the inner space of the containment structure into a first chamber 21 and a second chamber 22, both having variable volume depending on the shape adopted by the diaphragm 20. The diaphragm 20 is flexible and mounted in a fluid-tight fashion between a first shell and a second shell, both of which are part of the containment structure 19. The first chamber 21 is made in such a way that it is fluid-tight and is connected to a duct 23 through which it is possible to vary its internal pressure. The pneumatic actuator 2 also comprises a detection device 24 positioned at the first chamber 21. The detection device 24 comprises a seat 26 containing a magnetic field detection sensor 27, and a connection element 28 which allows the detection device 24 to be connected to the containment structure 19. The detection sensor 27 is, advantageously, mounted in an elongate part 25 which penetrates inside the first chamber 21 but keeps the detection sensor 27 not in fluid communication with the first chamber 21.

The pneumatic actuator 2 also comprises a coupling cup 29 fixed to the diaphragm 20 and positioned in the first chamber 21, a spring 30 interposed between the coupling cup 29 and the containment structure 19, and a movable rod 3 extending through the containment structure 19. The movable rod 3 comprises a first end 31 fixed to the diaphragm 20 and to the coupling cup 29, and a second end 32, outside the containment structure 19, which can be connected to the device to be controlled (such as a turbine of a turbo-compressor).

The spring 30 is designed to oppose the variations in the volume of the first chamber 21 with variable volume. The combined action of the pressure variation and the spring 30 may therefore cause a controlled movement of the diaphragm 20 and of the coupling cup 29 and, consequently, of the movable rod 3 fixed to it.

The device 1 for generating a magnetic field according to this invention is positioned inside the first chamber 21 in a position adjacent to the detection device 24 with the magnet 10 magnetically coupled to the detection sensor 27. In particular, the device 1 for generating a magnetic field is positioned alongside the part of the detection device 24 in which the housing 8 containing the detection sensor 27 is made, to allow the detection sensor 27 to detect the magnetic field generated by the magnet 10.

Moreover, the device 1 for generating a magnetic field is fixed to the coupling cup 29 by hooking means 18. As illustrated in the figures, the hooking means 18 comprise an annular plate 33 fixed to the coupling cup 29 and equipped with a plurality of radial tabs 34 plastically bent back to clamp the flange 6 against the annular plate 33.

On the flange 6 of the device 1 for generating a magnetic field there are advantageously recesses 35 substantially shaped to match the tabs 34, in which the latter are inserted.

The hooking means 18 cause compression of the closing element 13 against the coupling cup 29 and/or the movable rod 3. That compression allows stable positioning of the magnetic field generating device 1 relative to the coupling cup 29, to the diaphragm 20 and to the movable rod 3, and allows the magnet 10 to be locked in a stable position.

Figure 2:
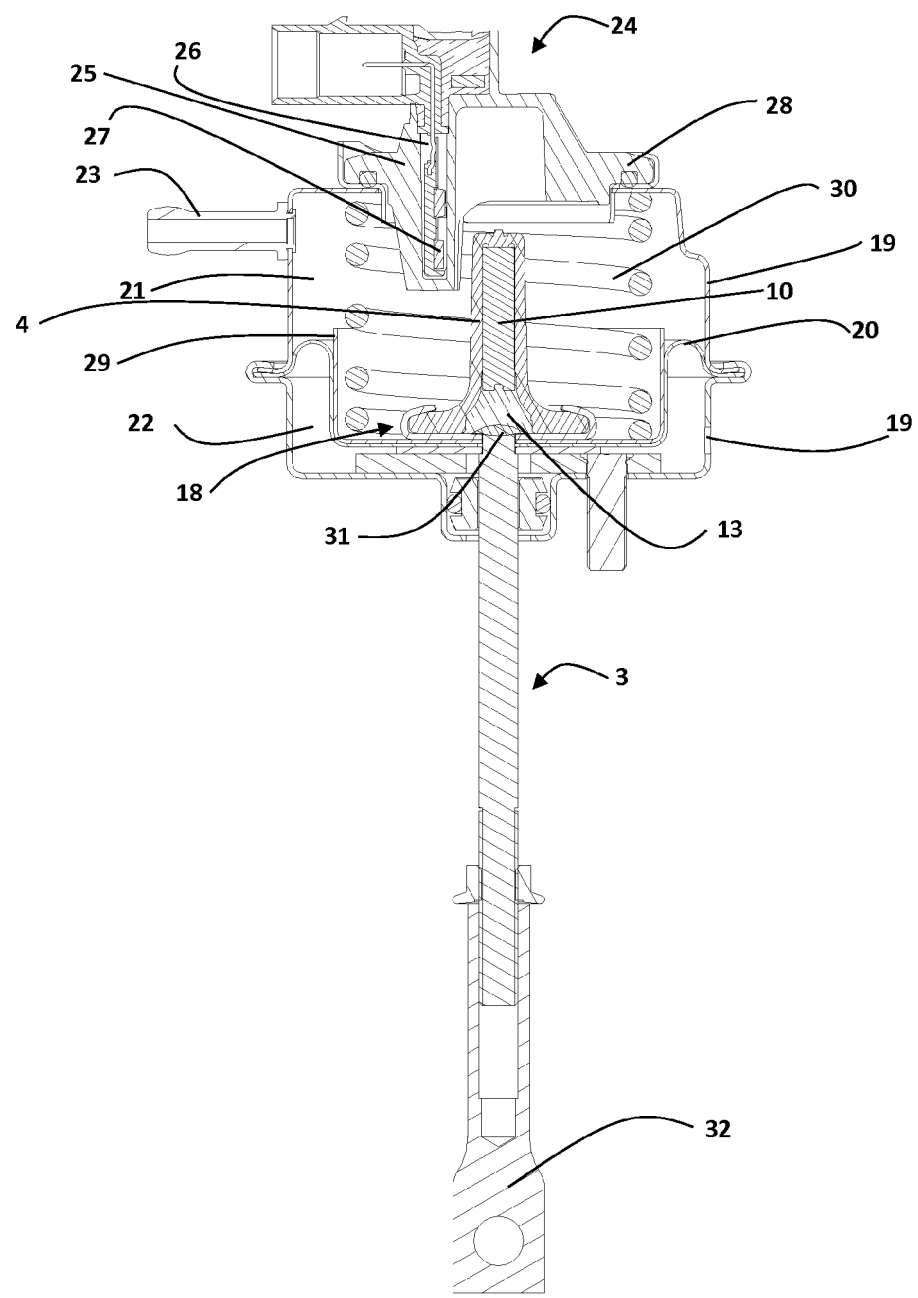
FIG. 2 is a cross-sectional view of the pneumatic actuator of FIG. 1 according to section line II-II.
Figure 4:
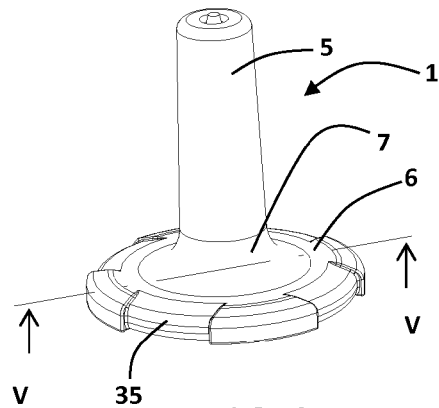
FIG. 4 is an axonometric view of the device for generating a magnetic field made in accordance with this invention.
Figure 5:
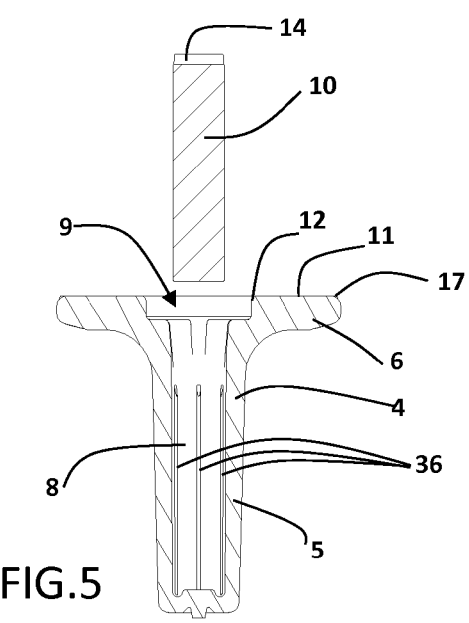
FIG. 5 is a cross-sectional view of a containment element of the device of FIG. 4 before a magnet insertion step, according to section line V-V of FIG. 4.
Figure 6:
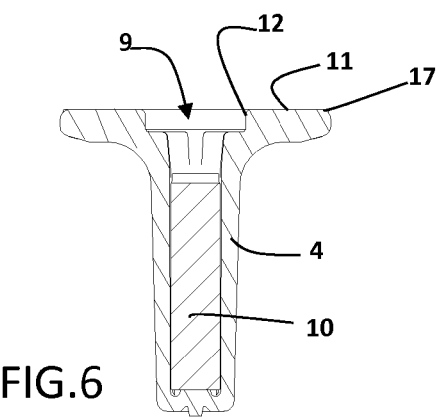
FIG. 6 shows the containment element of FIG. 5 after the magnet insertion step.

In particular, in the embodiments illustrated in the accompanying figures, the first end 31 of the movable rod 3 compresses the closing element 13 of the device 1 for generating a magnetic field. It should be noticed that in FIG. 2 the closing element 13 and the head of the first end 31 are illustrated partly overlapping in order to highlight the interference at design level which allows the compression to be achieved during the actual assembly step.

The method for making a device 1 for generating a magnetic field according to this invention comprises first the operating step of taking a containment element 4, in turn comprising an elongate portion 5 and a flange 6 positioned at the base 7 of the elongate portion 5, a housing 8 inside the elongate portion 5, and a mouth 9 of the housing 8. The flange 6 comprises an annular surface 11 extending mainly flat and an inner edge 12 which surrounds the mouth 9 of the housing 8. Advantageously, the containment element 4 is made of plastic material and may be purchased on the market or prepared by moulding in one piece.

The method according to this invention then comprises a step of inserting a magnet 10 in the housing 8 through the mouth 9 until the magnet 10 is completed inserted in the housing 8 and, preferably, until the magnet 10 is caught in the housing 8. Advantageously, the magnet 10 may be shaped to match the housing 8, whilst in the embodiments illustrated in the accompanying figures the walls of the housing 8 comprise spaced raised ribs 36, extending parallel to the line of extension of the housing 8, and which allow stable positioning of the magnet 10 in the housing 8 and prevent it from rotating relative to the housing 8. For that purpose, the magnet 10 is preferably caught between said ribs 36 even with deformation of the ribs 36.

Moreover, the method then comprises a step of inserting in the housing 8, through the mouth 9, a polymeric material in liquid or gel form until part of the polymeric material comes out of the mouth 9 and extends beyond the main plane of extension of the annular surface 11.

In a first embodiment illustrated in FIG. 7, the polymeric material does not extend on the annular surface 11, whilst, in a second embodiment shown in FIG. 8, the polymeric material also partly extends on the annular surface 11.

Reasonably, the polymeric material will have a viscosity suitable for allowing its insertion in the housing 8 and above all for allowing it to come out of the mouth 9 without this resulting in excessive expansion of the annular surface 11 or even outside the annular surface 11.

In the preferred embodiments in which the magnet 10 comprises a groove 14 on a face 15, the polymeric material is also inserted in the groove 14.

Finally, the method according to this invention comprises a step of making the polymeric material solidify or leaving it to solidify, creating a closing element 13 which is fixed to the containment element 4 and which partly projects relative to the main plane of extension of the annular surface 11. Depending on the type of polymeric material used or depending on production requirements, solidification of the polymeric material may advantageously be achieved by subjecting the material to thermal treatments, or not.

This invention brings important advantages.

In fact, thanks to the use of the same element for sealing the housing and locking the magnet, and for stably positioning the device in the pneumatic actuator by compensating for coupling tolerances, the device for generating a magnetic field according to this invention is less expensive to make than the prior art devices.

Moreover, in the preferred embodiments in which the groove is present on the face of the magnet, thanks to the closing element created by solidification of the polymeric material both inside the housing and inside the groove in the magnet, the magnet is prevented from rotating relative to the housing, in use guaranteeing a correct reading of the position of the movable rod by the detection device.

Finally, it should be noticed that even the cost linked to implementing this invention is not high.

The invention described above may be modified and adapted in several ways without thereby departing from the scope of the inventive concept.

All details of the invention may be substituted with other technically equivalent elements and the materials used, as well as the shapes and dimensions of the various components, may vary according to requirements.

The invention claimed is:

1. A device (1) for generating a magnetic field, comprising a containment element (4) including an elongate portion (5) and a flange (6) at a base (7) of the elongate portion (5), a housing (8) inside the elongate portion (5), a mouth (9) of the housing (8) and a magnet (10) positioned in the housing (8), the flange (6) comprising an annular surface (11) extending mainly flat with an inner edge (12) surrounding the mouth (9) of the housing (8), wherein the device (1) also comprises a closing element (13) inserted in the housing (8)

through the mouth (9) of the housing (8) and extending outside the housing (8) beyond a main plane of extension of the annular surface (11), wherein the closing element (13) is substantially made of an elastically compressible polymeric material solidified directly in the housing (8), and wherein the magnet (10) comprises a groove (14) on a face (15) which faces towards the mouth (9) of the housing (8) in which the solidified polymeric material is inserted, the device (1) being associable with a movable rod (3) of a pneumatic actuator (2).

2. The device according to claim 1, wherein the closing element (13) seals the housing (8).

3. The device according to claim 1, wherein the closing element (13) partly extends on the annular surface (11).

4. The device according to claim 1, wherein a surface portion (16) of the annular surface (11) located between an outer edge (17) of the annular surface (11) and the closing element (13) is substantially flat.

5. The device according to claim 1, wherein the housing (8) extends mainly along an axis substantially perpendicular to the main plane of extension of the annular surface (11).

6. A pneumatic actuator (2) comprising the device (1) for generating a magnetic field according to claim 1.

7. The pneumatic actuator (2) according to claim 6, also comprising a containment structure (19), a diaphragm (20) inside the containment structure (19) which divides the containment structure (19) into a first chamber (21) and a second chamber (22), a detection device (24) connected to the first chamber (21), a coupling cup (29) fixed to the diaphragm (20) and positioned at the first chamber (21), a spring (30) interposed between the coupling cup (29) and the containment structure (19), a movable rod (3) extending inside the second chamber (22) and comprising a first end (31) fixed to the diaphragm (20) and to the coupling cup (29) and a second end (32) outside the containment structure (19) and in use connectable to a device to be controlled, the detection device (24) containing a detection sensor (27) for detecting a magnetic field, the device (1) for generating a magnetic field being positioned inside the first chamber (21) in a position adjacent to the detection device (24) with the magnet (10) magnetically coupled to the detection sensor (27) and fixed to the coupling cup (29) by hooking means (18) which cause the compression of the closing element (13) against the coupling cup (29) and/or the movable rod (3).

8. A method for making a magnetic field generating device (1) associable with a movable rod (3) of a pneumatic actuator (2), the method comprising the operating steps of:
 taking a containment element (4) comprising an elongate portion (5) and a flange (6) positioned at a base (7) of the elongate portion (5), a housing (8) inside the elongate portion (5) and a mouth (9) of the housing (8), the flange (6) comprising an annular surface (11) extending mainly flat with an inner edge (12) surrounding the mouth (9) of the housing (8);
 inserting a magnet (10) in the housing (8) through the mouth (9) until the magnet (10) is completely inserted in the housing (8), the magnet (10) comprising a groove (14) on a face (15) which faces towards the mouth (9) of the housing (8) when the magnet (10) is completely inserted in the housing (8);
 inserting in the housing (8) through the mouth (9) a polymeric material in liquid or gel form until part of the polymeric material comes out of the mouth (9) of the housing (8) and extends beyond a main plane of extension of the annular surface (11), the polymeric material being also inserted in the groove (14) in the magnet (10);
 making the polymeric material solidify or leaving the polymeric material to solidify, creating an elastically deformable closing element (13) which is fixed to the containment element (4), the elastically deformable closing element (13) being created both inside the housing (8) and inside the groove (14) in the magnet (10).

\* \* \* \* \*